(12) United States Patent
Reyer et al.

(10) Patent No.: US 11,274,593 B2
(45) Date of Patent: Mar. 15, 2022

(54) PROCESS FOR MANUFACTURING AN EXHAUST GAS TREATMENT DEVICE

(71) Applicant: Eberspächer Exhaust Technology GmbH, Neunkirchen (DE)

(72) Inventors: Bernhard Reyer, Esslingen (DE); Bernd Müller, Saarwellingen (DE); Jürgen Häberle, Stuttgart (DE); Sylvia Hartmann, Schiffweiler (DE); Michael Krause, Esslingen (DE)

(73) Assignee: PUREM GMBH, Neunkirchen (DE)

( * ) Notice: Subject to any disclaimer, the term of this patent is extended or adjusted under 35 U.S.C. 154(b) by 182 days.

(21) Appl. No.: 16/662,763

(22) Filed: Oct. 24, 2019

(65) Prior Publication Data
US 2020/0131975 A1    Apr. 30, 2020

(30) Foreign Application Priority Data
Oct. 25, 2018    (DE) ..................... 10 2018 126 577.8

(51) Int. Cl.
*F01N 13/18* (2010.01)
*F01N 3/28* (2006.01)

(52) U.S. Cl.
CPC ..... *F01N 13/1894* (2013.01); *F01N 13/1805* (2013.01); *F01N 13/185* (2013.01); *F01N 3/2853* (2013.01); *F01N 13/1888* (2013.01); *F01N 2330/04* (2013.01); *F01N 2450/02* (2013.01); *F01N 2450/22* (2013.01)

(58) Field of Classification Search
CPC ............... F01N 13/1805; F01N 13/185; F01N 13/1894; F01N 2450/02
See application file for complete search history.

(56) References Cited

U.S. PATENT DOCUMENTS

| 5,829,132 A | 11/1998 | Sickels et al. |
| 2002/0071791 A1* | 6/2002 | Foster ................... F01N 3/2853 |
| | | 422/179 |
| 2003/0103876 A1 | 6/2003 | Foster et al. |

(Continued)

FOREIGN PATENT DOCUMENTS

| CN | 1653249 A | 8/2005 |
| CN | 202659316 U | 1/2013 |

(Continued)

*Primary Examiner* — Jonathan R Matthias
(74) *Attorney, Agent, or Firm* — McGlew and Tuttle, P.C.

(57) ABSTRACT

A process manufactures an exhaust gas treatment device including a tubular circumferential wall (14) elongated along a longitudinal axis (L) with two axial end areas, an exhaust gas treatment unit (52) arranged in the circumferential wall and a closing element (20, 38) connected to the circumferential wall at the two axial end areas. The exhaust gas treatment unit is held at the circumferential wall by a supporting material layer (54) enclosing the exhaust gas treatment unit and supporting same in relation to the circumferential wall. The process includes arranging a first of the two closing elements at one of the axial end areas of the circumferential wall, pushing the exhaust gas treatment unit enclosed by the supporting material layer into the circumferential wall from the other axial end area (18), and arranging a second of the closing elements at the other axial end area of the circumferential wall.

15 Claims, 3 Drawing Sheets

(56) References Cited

U.S. PATENT DOCUMENTS

| | | |
|---|---|---|
| 2007/0011874 A1 | 1/2007 | Myers |
| 2007/0071656 A1 | 3/2007 | Wirth et al. |
| 2008/0093421 A1* | 4/2008 | Forster ................ F01N 13/1894 228/153 |
| 2015/0121845 A1* | 5/2015 | Wirth .................... F01N 3/2853 60/272 |

FOREIGN PATENT DOCUMENTS

| | | |
|---|---|---|
| CN | 102979607 A | 3/2013 |
| EP | 1 149 992 A1 | 10/2001 |
| EP | 1 767 752 A1 | 3/2007 |

* cited by examiner

PROCESS FOR MANUFACTURING AN EXHAUST GAS TREATMENT DEVICE

CROSS REFERENCE TO RELATED APPLICATIONS

This application claims the benefit of priority under 35 U.S.C. § 119 of Application 10 2018 126 577.8, filed Oct. 25, 2018, the entire contents of which are incorporated herein by reference.

TECHNICAL FIELD

The present invention pertains to a process for manufacturing an exhaust gas treatment device, for example, a particle filter device for an exhaust system of an internal combustion engine.

TECHNICAL BACKGROUND

Such exhaust gas treatment devices comprise, in general, a tubular housing, which is provided by a circumferential wall and into which a particle filter, enclosed by a layer of a fiber material holding the exhaust gas treatment device at the circumferential wall, is pushed. Generally funnel-shaped closing elements, via which the exhaust gas treatment device can be connected to other system areas of an exhaust system, for example, exhaust pipes, are provided at both axial ends of the circumferential wall.

SUMMARY

An object of the present invention is to provide a process for manufacturing an exhaust gas treatment device, with which an exhaust gas treatment device with a reliably operating, compact configuration can be provided in a manner that can be carried out easily.

This object is accomplished according to the present invention by a process for manufacturing an exhaust gas treatment device, the exhaust gas treatment device comprising a tubular circumferential wall elongated in the direction of a longitudinal axis with two axial end areas, an exhaust gas treatment unit arranged in the circumferential wall as well as a closing element connected to the circumferential wall at each of the two axial end areas of the circumferential wall, wherein the exhaust gas treatment unit is held at the circumferential wall by a support material layer, which encloses the exhaust gas treatment unit and supports same in relation to the circumferential wall, the process comprising the following steps:

a) arrangement of a first of the two closing elements at one of the axial end areas of the circumferential wall,
b) after step a), pushing of the exhaust gas treatment unit enclosed by the supporting material layer into the circumferential wall at the other axial end area of the circumferential wall, and
c) after step b), arrangement of a second of the closing elements at the other axial end area of the circumferential wall.

Since one of the closing elements is fixed in the process according to the present invention at the circumferential wall already before the exhaust gas treatment unit is pushed into the circumferential wall, the risk that the exhaust gas treatment unit or/and the supporting material layer enclosing this would be damaged, as a consequence of which the functionality of the exhaust gas treatment device would be compromised, is absent when the exhaust gas treatment unit is already held in the circumferential wall and an operation is then carried out to fix this closing element at the circumferential wall.

When a tubular circumferential wall connection area of the first closing element, extending around the one axial end area of the circumferential wall radially on the outside, is pushed in step a) onto the circumferential wall and is connected to the circumferential wall by connection in substance, preferably by welding, obstacles present on the inner side of the circumferential wall, which could compromise the pushing in of the exhaust gas treatment unit enclosed with the supporting material layer, are avoided.

In order to guarantee, for the process of pushing in the exhaust gas treatment unit, that the circumferential wall and possibly the closing element already connected to this have a suitable dimensioning for receiving and holding the exhaust gas treatment unit enclosed with the supporting material layer, it is proposed that the circumferential wall be deformed, preferably radially widened, in step a) for providing a desired dimension after arranging the first closing element at the circumferential wall.

An axially compact configuration can be supported by the exhaust gas treatment unit enclosed with the supporting material layer being pushed in step b) into the circumferential wall to the extent that the supporting material layer extends in an axial area of the connection in substance of the first closing element to the circumferential wall or/and that supporting material layer axially overlaps the circumferential wall connection area of the first closing element. Since the positioning of the exhaust gas treatment unit or of the supporting material layer is carried out only after the closing element has been connected to the circumferential wall, there is no risk that the supporting material layer or/and the exhaust gas treatment unit would be damaged due to a connection of the closing element to the circumferential wall, which is brought about, for example, by welding.

For an axially compact configuration, the exhaust gas treatment unit enclosed with the supporting material layer can be pushed in step b) into the circumferential wall to the extent that the exhaust gas treatment unit does not extend over the one axial end area of the circumferential wall. The procedure followed is preferably such that the exhaust gas treatment unit enclosed with the supporting material layer is pushed in step b) into the circumferential wall to the extent that the exhaust gas treatment unit ends essentially flush with the circumferential wall.

It is proposed in an alternative procedure, which leads to an axially even more compact configuration, that the exhaust gas treatment unit enclosed with the supporting material layer be pushed in step b) into the circumferential wall to the extent that the exhaust gas treatment unit extends beyond the one axial end area of the circumferential wall and into a closing element interior space formed in the first closing element. Since the exhaust gas treatment unit is not enclosed by the circumferential wall in the length area extending into the closing element interior space, provisions may preferably be made for the exhaust gas treatment unit not to be enclosed by the supporting material layer in its length area that extends into the closing element interior space. The supporting material layer could not exert any effect in this length area that could ensure the supporting or holding of the exhaust gas treatment unit in relation to the circumferential wall.

To close the interior space of the exhaust gas treatment device at the other axial end area as well, a tubular circumferential wall connection area of the second closing element can be pushed in step c) into the other axial end area of the circumferential wall and connected to the circumferential wall by connection in substance, preferably by welding.

To make it possible to integrate an exhaust gas treatment device manufactured according to the present invention into an exhaust system in a simple manner, it is proposed that at least one and preferably each closing element comprise a funnel-like tapering area between a tubular circumferential wall connection area and a tubular exhaust gas pipe connection area.

The first closing element may be an inlet closing element positioned upstream in relation to the circumferential wall in an exhaust system in relation to the exhaust gas flow direction.

Since the configuration according to the present invention creates the possibility of positioning the exhaust gas treatment unit with the supporting material layer enclosing same such that the supporting material layer overlaps the area in which the first closing element is connected to the circumferential wall and thus insulates the exhaust gas treatment unit thermally inwards, no additional measures need to be taken to protect this connection area from high temperatures, which also occur in an exhaust system during the combustion operation of an internal combustion engine. It is possible for this reason, in the process according to the present invention, to proceed such that a closing element interior space formed in the first closing element is free from an inner funnel element (has no inner funnel element). This means that no inner funnel element nor any other assembly unit that shields the area of the permanent connection of the first closing element to the circumferential wall against the direct incoming flow of exhaust gas is provided in this closing element interior space. An inner funnel element, which can shield especially the area in which the second closing element is connected in substance to the circumferential wall against the direct incoming flow of exhaust gas, may be arranged in a closing element formed in the second closing element.

In order to avoid heat losses to the outside and thus to guarantee that a suitable temperature is reached as rapidly as possible for the operation of the exhaust gas treatment unit and can also be maintained at low ambient temperatures, it is further proposed that at least the first closing element be enclosed after step a) with an insulating material layer and with a thin-wall insulation covering the insulating material layer on the outer side thereof. It should be noted in this connection that this process step can be carried out, in principle, at any time after the first closing element has been fixed at the circumferential wall. This procedure is advantageously carried out after the second closing element has also been fixed at the circumferential wall, i.e., consequently after the exhaust gas treatment device has otherwise been completely assembled.

The supporting material layer may comprise a fiber material mat wound around the outer circumference of the exhaust gas treatment unit. The exhaust gas treatment unit may comprise a particle filter.

The present invention further pertains to an exhaust gas treatment device, preferably manufactured with a process according to the present invention, comprising:
a tubular circumferential wall elongated in the direction of a longitudinal axis with two axial end areas,
a first closing element, which overlaps the circumferential wall radially on the outside at one of the axial end areas of the circumferential wall with a circumferential wall connection area and is fixed at the circumferential wall by connection in substance, preferably by welding,
a second closing element, which is fixed at the circumferential wall by connection in substance, preferably by welding, at the other of the axial end areas of the circumferential wall with a circumferential wall connection area,
an exhaust gas treatment unit enclosed with a supporting material layer and held by the supporting material layer at the circumferential wall,
wherein:
the supporting material layer extends in an axial end area of the circumferential wall in an axial area of the connection in substance of the first closing element to the circumferential wall or/and it axially overlaps the circumferential wall connection area of the first closing element,
or/and
the exhaust gas treatment unit extends beyond the one axial end area of the circumferential wall into a closing element interior space formed in the first closing element,
or/and
a closing element interior space formed in the first closing element is free from an inner funnel element.

It should be noted that such an exhaust gas treatment device may have, in addition to the above-mentioned feature groups, individually and in any desired combination, all the features that are relevant for the configuration of the exhaust gas treatment device and were explained above in reference to the process according to the present invention and will be described below in detail.

The present invention further pertains to an exhaust system, comprising an exhaust gas treatment device having the configuration explained above and manufactured preferably with a process according to the present invention.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
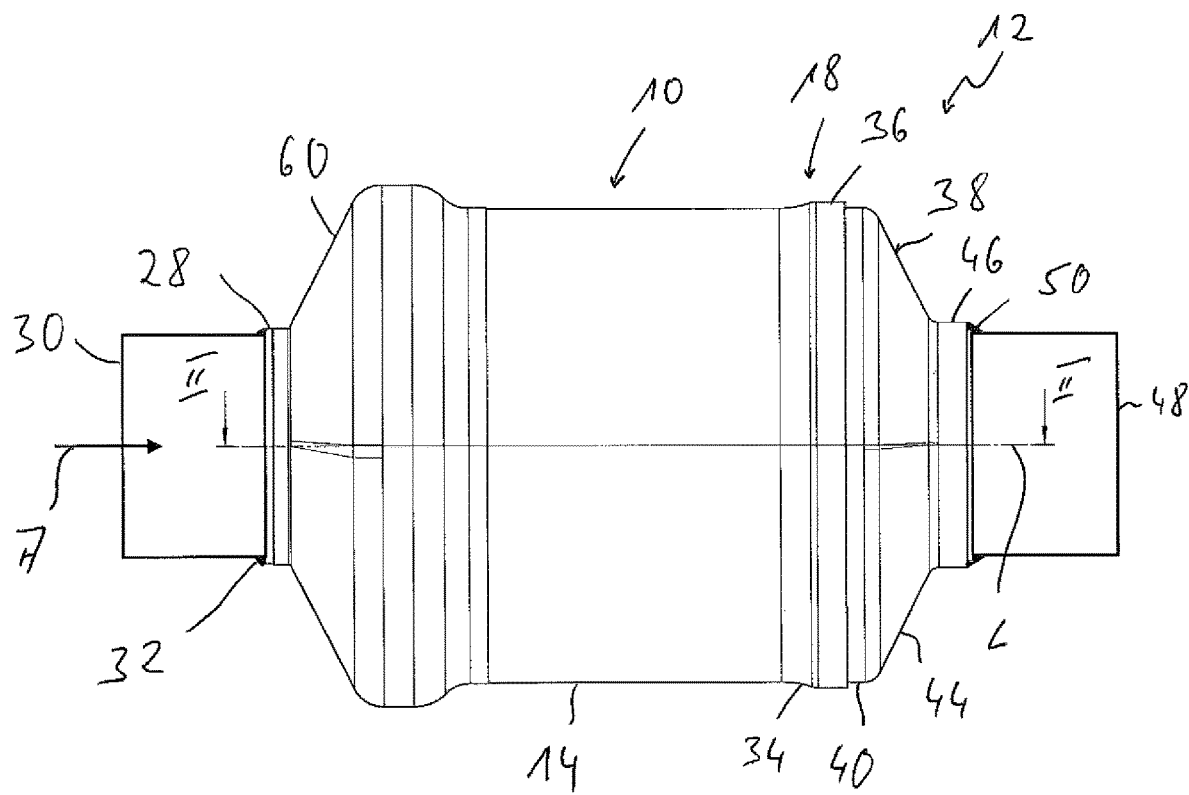
FIG. 1 is a schematic view of a part of an exhaust system for an internal combustion engine.
Figure 2:
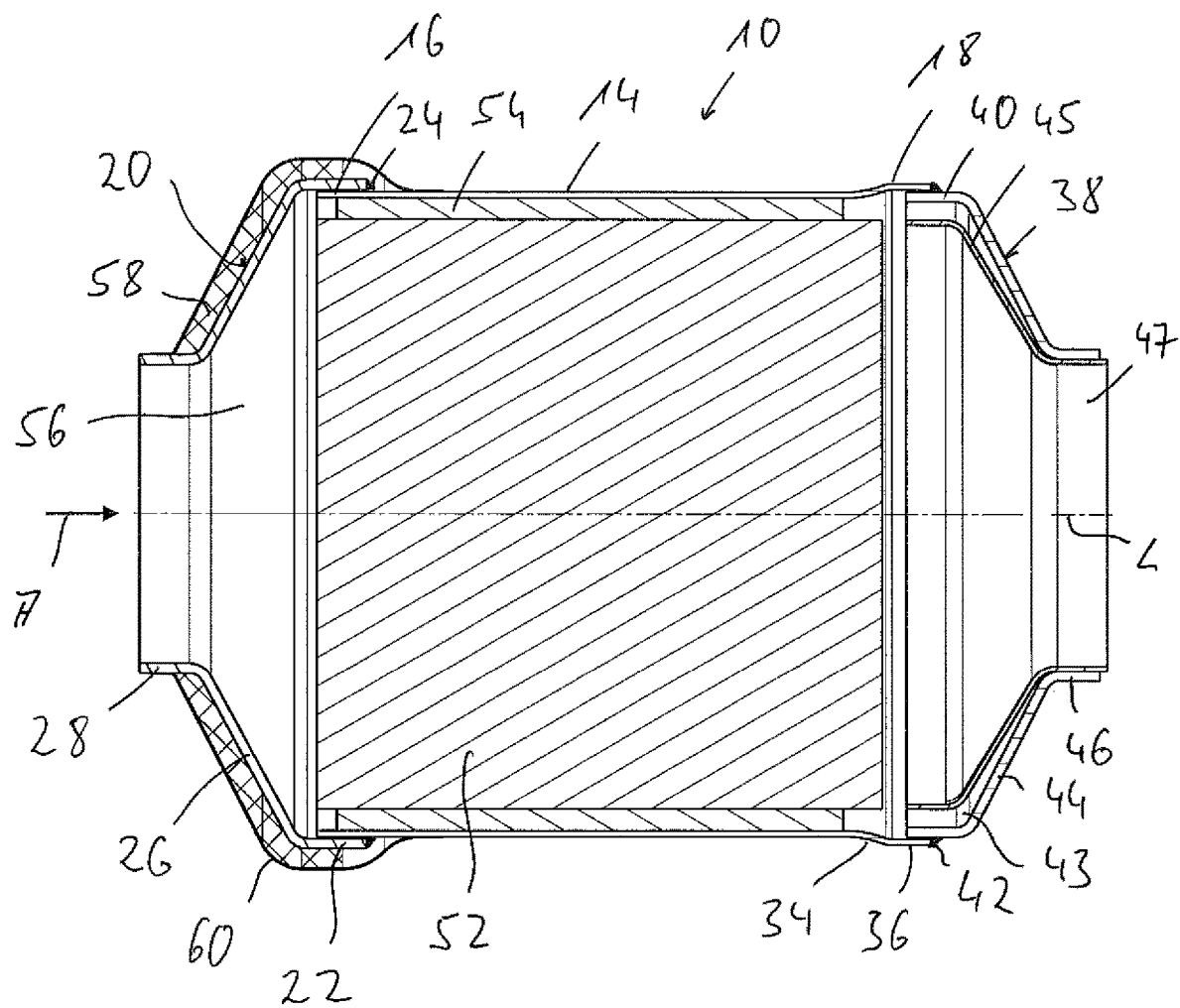
FIG. 2 is a longitudinal sectional view of an exhaust gas treatment device of the exhaust system according to FIG. 1, cut along a line I-I in FIG. 1.

Referring to the drawings, FIG. 1 and FIG. 2 show an exhaust gas treatment device 10 of an exhaust system, generally designated by 12, of an internal combustion engine in a vehicle, which said exhaust gas treatment device is configured, for example, in the form of a particle filter device. The exhaust gas treatment device 10 comprises a tubular, essentially cylindrically shaped circumferential wall 14 elongated in the direction of a longitudinal axis L with two axial end areas 16, 18. At the first axial end area 16, the circumferential wall 14 is permanently connected to a first closing element 20. An essentially tubular or cylindrically shaped circumferential wall connection area 22 of the first closing element 20 is pushed, for this purpose, over the axial end area 16 of the circumferential wall 14 and is permanently connected to the circumferential wall 14 by a weld seam 24 preferably extending fully circumferentially in the circumferential direction. The first closing element 20 has, adjoining the circumferential wall connection area 22, a tapering area 26 tapering in a funnel shape, which is adjoined by a likewise tabularly or essentially cylindrically shaped exhaust gas connection area 28. An exhaust gas pipe 30 carrying exhaust gas in an exhaust gas flow direction A to the exhaust gas treatment device 10 from, for example, an internal combustion engine or from a system area of the exhaust system 12, which system area is located farther upstream, can be pushed into the exhaust gas pipe connection area 28 and connected to same permanently by a weld seam, 32 preferably extending fully in the circumferential direction.

At the second axial end area 18, the circumferential wall 14 is widened radially in a transition area 34 and has, adjoining the transition area 34, an essentially cylindrically shaped end section 36, into which a second closing element 38 with an essentially tubular or cylindrical circumferential wall connection area 40 is pushed. In the circumferential wall second axial end area 18, the circumferential wall 14 is permanently connected to the second closing element 38 by a weld seam 42 preferably extending essentially fully in the circumferential direction.

Adjoining the circumferential wall connection area 40, the second closing element 38 has a tapering area 44 tapering in a funnel shape and, adjoining this, a tubular or essentially cylindrical exhaust gas pipe connection area 46. An inner funnel element 45 adapted in its shape essentially to the funnel shape of the second closing element 38 is provided in a closing element interior space 43 enclosed essentially by the second closing element 38. This inner funnel element 45 is pushed with an essentially cylindrical end area 47 into the exhaust gas pipe connection area 46, preferably such that the end area 47 projects axially outwards in the direction of the longitudinal axis L over the exhaust gas pipe connection area 46. An exhaust gas pipe 48 receiving the exhaust gas discharged from the exhaust gas treatment device 10 is pushed into the end area 47 of the inner funnel element 45 or into the exhaust gas connection area 46 receiving this end area 47 and is connected permanently by a weld seam 50 extending preferably essentially fully circumferentially in the circumferential direction. Since the end area 47 of the inner funnel element 45 projects axially over the exhaust gas pipe connection area 46, a permanent connection of the inner funnel element 45 to the second closing element 38 is also brought about by the weld seam 50. The inner funnel element 45 may be shaped and dimensioned such that inner funnel element 45 extends, with the exception of the end area 47 pushed into the exhaust gas pipe connection area 46, leaving an intermediate space, at a spaced location from the tapering area 44 and from the circumferential wall connection area 40 of the second closing element 38 and ends, for example, axially approximately flush with the circumferential wall connection area 40.

An exhaust gas treatment unit 52 is arranged in the interior space of the exhaust gas treatment device 10, which interior space is enclosed radially outwards by the circumferential wall 14. The exhaust gas treatment unit 52 is configured as a particle filter in the embodiment of the exhaust gas treatment device 10 as a particle filter device and is enclosed preferably essentially completely by a supporting material layer 54 on an exhaust gas treatment device outer circumference. Due to the supporting material layer 54 being held in a compressed state between the exhaust gas treatment unit 52 and the circumferential wall 14, the exhaust gas treatment unit 52 is supported at the circumferential wall 14 and is held firmly in relation to this in the radial direction as well as in the axial direction. The supporting material layer 54 may comprise, for example, a fiber material layer or fiber material mat, which is wound around the outer circumference of the exhaust gas treatment unit 52 and may be built up with one or more radially staggered layers.

It can be seen in FIG. 2 that the exhaust gas treatment unit 52 ends axially flush with the circumferential wall 14 at the end area 16 of the circumferential wall 14. The supporting material layer 54 may be set back somewhat in the axial direction. However, the supporting material layer 54 extends in the axial direction to the extent that the supporting material layer 54 axially overlaps the area in which the first closing element 20 is permanently connected by the weld seam 24 to the circumferential wall 14 and is thus located axially between the weld seam 24 and the exhaust gas treatment unit 52. In the area of the downstream end area 18, the exhaust gas treatment unit 52 already ends before the circumferential wall 14, for example, approximately in the area of the transition area 34. A mutual interference with the second closing element 38 or with the inner funnel element 45 arranged therein is avoided with this configuration. The inner funnel element 45 ends at a short axial distance in front of the outflow end of the exhaust gas treatment unit 52 and thus the exhaust gas treatment unit 52 essentially takes up the exhaust gas being discharged from this outflow end. The inner funnel element 45 thus shields the second closing element 38 and especially also the area in which the latter is permanently connected to the circumferential wall 14 against the direct incoming flow of the exhaust gas leaving the exhaust gas treatment unit 52.

Exhaust gas generated during the operation of an internal combustion engine flows in the exhaust system 10 in an exhaust gas flow direction A into a closing element interior space 56 enclosed by the closing element 20. The closing element 20 thus forms an inlet closing element positioned in the upstream area in the exhaust gas treatment device 10. The exhaust gas thus entering the closing element interior space 56 then flows through the exhaust gas treatment unit 52, the exhaust gas is treated therein, for example, extensively freed from soot particles, and the exhaust gas leaves the exhaust gas treatment device 10 at the downstream end thereof via the second closing element 38 providing an outlet closing element and the inner funnel element 45 provided therein and is carried to further system areas of the exhaust system 12 via the exhaust gas pipe 48.

In order to avoid heat losses especially in the upstream area, i.e., upstream of the exhaust gas treatment unit 52, the first closing element 20 is enclosed on a first closing element outer side by an insulating material layer 58, which is shielded towards the outside by a thin-wall insulation 60. While the insulating material layer 58 may be built with, for example, glass fiber material or the like, the thin-wall insulation 60 is preferably made of sheet metal, for example, with two half shells, which are connected to one another with two mutually adjacent circumferential areas by positive-locking connection, for example, beading, or/and by connection in substance, for example, welding, and which may additionally be connected permanently in thin wall insulation axial end areas to the circumferential wall 14, on the one hand, and to the first closing element 20, on the other hand, in their axial end areas.

A process for manufacturing an exhaust gas treatment device 10, as it is shown in FIG. 1, will be described below in detail.

The circumferential wall 14 and the two closing elements 20, 38 are first provided as shaped sheet metal parts in this manufacturing process. For example, the two closing elements 20, 28 may be produced by deep-drawing respective disk-like sheet metal blanks, while the circumferential wall 14 may be manufactured by rolling a sheet metal blank into a tubular structure and connecting the edges of the sheet metal blank, which edges adjoin each other in the circumferential direction in this state, to one another by welding.

The first closing element 20 forming an inlet closing element is then pushed with the first closing element circumferential wall connection area 22 over the axial end area 16 of the circumferential wall 14. These components are then connected permanently to one another by preparing the weld seam 24.

After establishing this connection, the circumferential wall 14 provided at first with a predefined smaller than specified dimension can be radially widened to the desired dimension suitable for receiving the exhaust gas treatment unit 52. As an alternative, this calibration process may also have been carried out already prior to the assembly of the circumferential wall 14 with the first closing element 20. Further, the circumferential wall 14 may also be provided with the radially widened structure recognizable in FIG. 2 in the circumferential wall axial end area 18 for receiving the second closing element either during the manufacturing process in which the circumferential wall 14 is manufactured or when the calibration process is carried out.

The exhaust gas treatment unit 52 enclosed with the supporting material layer 54 is subsequently pushed into the assembly comprising the circumferential wall 14 and the first closing element 20 at the axial end area 18 of the circumferential wall 14. To avoid damage to the supporting material layer 54 during this pushing in, a stuffing funnel, which is positioned such that the stuffing funnel axially adjoins the axial end area 18 and in which the supporting material layer 54 is radially compressed and can then be pushed into the circumferential wall 14 in this state, may be inserted in the axial end area 18 in addition to the radially already widened structure of the circumferential wall 14.

The exhaust gas treatment unit 52 is pushed into the circumferential wall 14 in the embodiment shown in FIG. 2 to the extent that the exhaust gas treatment unit 52 does not project axially over the circumferential wall 14 at the axial end area 16, i.e., at the upstream axial end of the circumferential wall 14. The exhaust gas treatment unit 52 may preferably be positioned such that the exhaust gas treatment unit 52 ends essentially flush with the circumferential wall 14 in the axial end area 16. The supporting material layer 54 enclosing the exhaust gas treatment unit 52 on the outside is dimensioned such that the supporting material layer 54 does not reach directly the axial end of the exhaust gas treatment unit 52 but ends at a short distance in front of the exhaust gas treatment unit 52, so that the supporting material layer 54 also ends with a slight axial setback in relation to the axial end area 16 of the circumferential wall 14. Parts of the supporting material layer 54 held in a radially compressed state by the circumferential wall 14 are prevented in this manner from projecting axially over the axial end area 16 of the circumferential wall 14 or the exhaust gas treatment unit 52 into the closing element interior space 56. The supporting material layer 54 is also dimensioned and arranged in the other axial end area 18 of the circumferential wall 14 such that the supporting material layer 54 does not reach the axial end of the exhaust gas treatment unit 52 but ends at a short distance in front of this axial end, so that the risk that parts of the supporting material layer axially yielding due to the radial compression would project axially over the exhaust gas treatment unit 52 is absent in this area as well.

However, the supporting material layer 14 is led to the axial end of the exhaust gas treatment unit 52 or into the axial end area 16 of the circumferential wall 14 to the extent that it axially covers the area in which the first closing element 20 is connected by the weld seam 24 to the circumferential wall 14 and is also overlapped axially in some areas with the circumferential wall connection area 22 of the first closing element 20. Thermal shielding is achieved in this manner for the weld seam 24 against the exhaust gases introduced with a high temperature into the exhaust gas treatment unit 52 during the combustion operation. Since the exhaust gas treatment unit 52 with the supporting material layer 54 surrounding same is pushed into the assembly comprising the circumferential wall 14 and the first closing element 20 only after the weld seam 54 has been prepared, there is no risk that a supporting material layer already positioned in the interior of the circumferential wall 14 could be damaged during the preparation of the weld seam 24.

In a next following operation, the second closing element 38 already accommodating the inner funnel element 45 is pushed into the radially widened axial end area 18 of the circumferential wall 14, especially into the end section 36 thereof. The inner funnel element 45 with the second closing element 38 is held in the exhaust gas pipe connection area 46 at this point in time, for example, only by insertion and by the resulting press fit of the end area 47 thereof. The second closing element 38 is then connected to the circumferential wall 14 by connection in substance by preparing the weld seam 42.

The exhaust gas treatment device 10, especially the first closing element 20, may be enclosed on the outer side with the insulating material layer 58 in the upstream end area already before or also only after the second closing element 38 is connected to the circumferential wall 14. The thin-wall insulation 60, configured, for example, with two half shells, can then be arranged such that the thin-wall insulation 60 covers the insulating material layer 58 radially on the outside and, axially adjoining the insulating material layer 58, the thin-wall insulation 60 overlaps the exhaust gas pipe connection area 28, on the one hand, and the circumferential wall 14, on the other hand, radially on the outside and is permanently connected there to the first closing element 20, on the one hand, and to the circumferential wall 14, on the other hand, for example, by welding.

The exhaust gas treatment device 10 manufactured in the above-described manner may then be connected in a next following operation to other system areas of the exhaust system 12, for example, the two exhaust gas pipes 30, 48. The exhaust gas pipe 30 is then pushed into the exhaust gas pipe connection area 28 of the first closing element 20 and is thus connected by preparing the weld seam 32. The exhaust gas pipe 48 is inserted into the end area 47 of the inner funnel element 45 and hence also into the exhaust gas pipe connection area 46 of the second closing element 38 and is connected to both the inner funnel element 45 and the second closing element 38 by preparing the weld seam 50, as a result of which a permanent connection of the inner funnel element 45 to the second closing element 38 is also prepared at the time.

Figure 3:
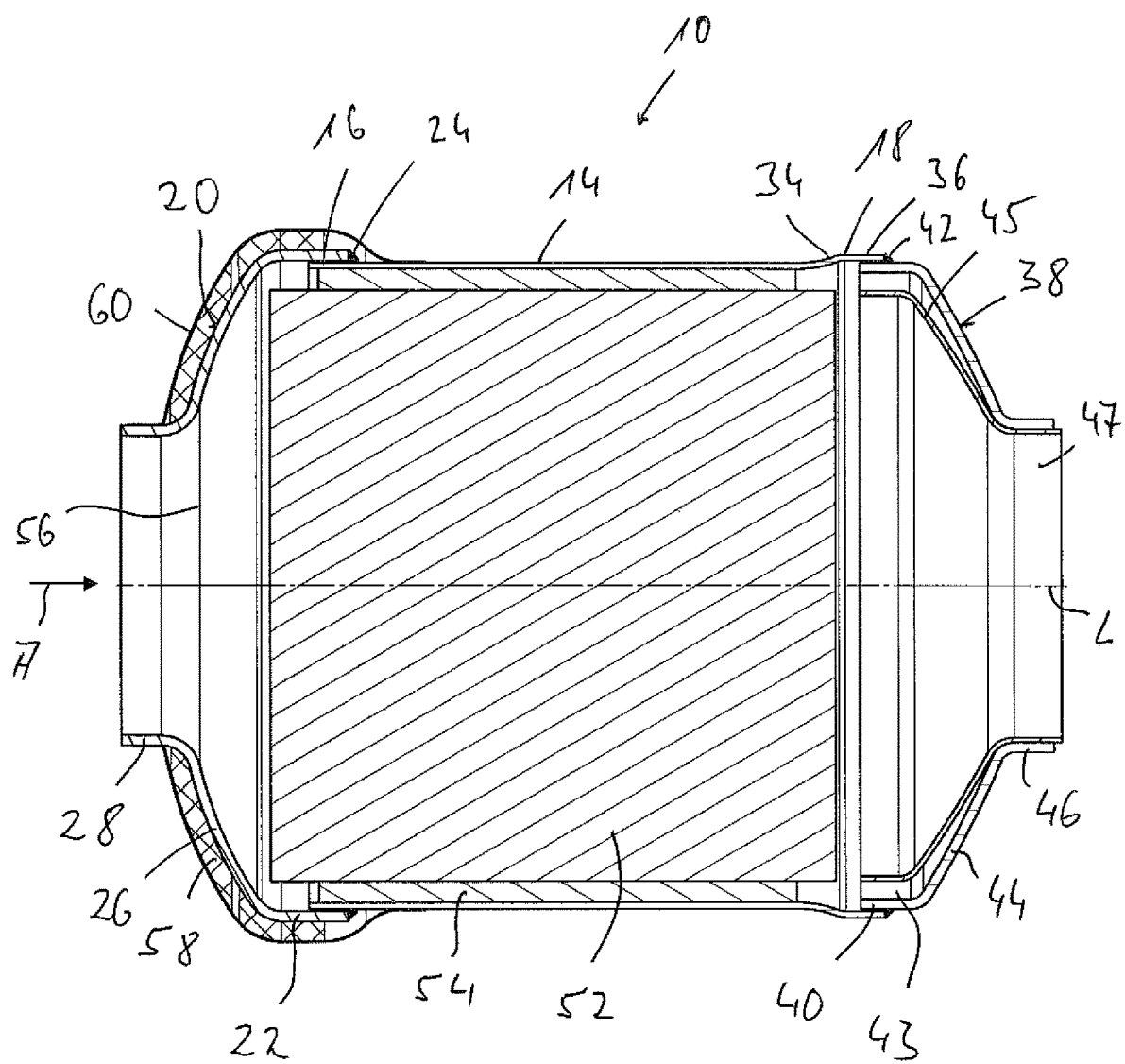
FIG. 3 is a longitudinal sectional view of an alternative embodiment of an exhaust gas treatment device, said view corresponding to FIG. 2.

An alternative type of configuration of an exhaust gas treatment unit is shown in FIG. 3. This corresponds, in terms of both its configuration and the procedure with which it can be manufactured, to the embodiment described in detail above with reference to FIG. 2, so that reference can be made to the above explanations.

It can be seen in FIG. 3 that the exhaust gas treatment unit 52 is pushed in this embodiment into the circumferential wall 14 to the extent that the exhaust gas treatment unit 52 projects in the exhaust gas treatment unit upstream end area axially over the axial end area 16 of the circumferential wall 14 and thus extends axially into the closing element interior space 56. This is possible especially also because no inner funnel element is provided in the interior of the first closing element 20. Such an inner funnel element is also unnecessary in the embodiment shown in FIG. 2 in the upstream end area of the exhaust gas treatment unit 52, i.e., in the closing element interior space 56, because the weld seam 14 generating the permanent connection of the first closing element 20 to the circumferential wall 14 is thermally shielded by the supporting material layer 54 and no additional measures are therefore necessary to prevent an excessive heating in the area of the weld seam 24.

The entire space available axially for installation is utilized even more efficiently with the configuration shown in FIG. 3. This makes it possible, compared to the embodiment shown in FIG. 2, for the entire exhaust gas treatment device 10 to have a shorter length axially with an equally dimensioned exhaust gas treatment unit 52 or to use an axially longer exhaust gas treatment unit 52, which leads to an even more efficient exhaust gas purification, in case of an equally dimensioned circumferential wall.

While specific embodiments of the invention have been shown and described in detail to illustrate the application of the principles of the invention, it will be understood that the invention may be embodied otherwise without departing from such principles.

What is claimed is:

1. A process for manufacturing an exhaust gas treatment device comprising a tubular circumferential wall elongated in the direction of a longitudinal axis with two axial end areas, an exhaust gas treatment unit arranged in a tubular space within the circumferential wall and closing elements, with each of the closing elements connected to the circumferential wall at one of the two axial end areas, wherein the exhaust gas treatment unit is held at the circumferential wall by a supporting material layer, which encloses the exhaust gas treatment unit and supports same in relation to the circumferential wall, wherein the process comprises the steps of:

arranging a first of the two closing elements at one of the axial end areas of the circumferential wall;

subsequent to said step of arranging, pushing, at the other axial end area of the circumferential wall, the exhaust gas treatment unit, enclosed by the supporting material layer, into the tubular space within the circumferential wall; and subsequent to said step of pushing, arranging a second of the closing elements at the other axial end area of the circumferential wall;

wherein:

the first closing element has a first closing element tubular circumferential wall connection area and, with the step of pushing, the first closing element tubular circumferential wall connection area is pushed onto the tubular circumferential wall such that the first closing element tubular circumferential wall connection area extends around the one axial end area of the tubular circumferential wall radially on an outside and is connected to the tubular circumferential wall by a connection in substance;

with the step of arranging a second of the closing elements at the other axial end area of the circumferential wall, a tubular circumferential wall connection area of the second closing element is pushed into the other axial end area of the circumferential wall and is connected to the circumferential wall by connection in substance.

2. The process in accordance with claim 1, wherein:

the first closing element tubular circumferential wall connection area is connected to the tubular circumferential wall by welding.

3. The process in accordance with claim 2, wherein with the step of pushing:

the exhaust gas treatment unit enclosed with the supporting material layer is pushed into the circumferential wall to an extent that the supporting material layer extends in an axial area of the connection in substance of the first closing element to the circumferential wall: or the exhaust gas treatment unit enclosed with the supporting material layer is pushed into the circumferential wall to an extent that the supporting material layer extends axially to overlap the circumferential wall connection area of the first closing element; or the exhaust gas treatment unit enclosed with the supporting material layer is pushed into the circumferential wall to an extent that the supporting material layer extends in an axial area of the connection in substance of the first closing element to the circumferential wall and to an extent that the supporting material layer extends axially to overlap the circumferential wall connection area of the first closing element.

4. The process in accordance with claim 1, wherein with the step of arranging a first of the two closing elements at one of the axial end areas of the circumferential wall, the circumferential wall is deformed with a radial widening, to provide a desired dimension after mounting the first closing element at the circumferential wall.

5. The process in accordance with claim 1, wherein with the step of pushing the exhaust gas treatment unit enclosed with the supporting material layer is pushed into the circumferential wall to the extent that the exhaust gas treatment unit does not extend beyond the one axial end area of the circumferential wall.

6. The process in accordance with claim 5, wherein with the step of pushing the exhaust gas treatment unit enclosed with the supporting material layer is pushed into the circumferential wall to the extent that the exhaust gas treatment unit ends essentially flush with an end of the circumferential wall.

7. The process in accordance with claim 1, wherein with the step of pushing the exhaust gas treatment unit enclosed with the supporting material layer is pushed into the circumferential wall to the extent that the exhaust gas treatment unit extends beyond the one axial end area of the circumferential wall into a closing element interior space formed in the first closing element.

8. The process in accordance with claim 7, wherein the exhaust gas treatment unit is not enclosed by the supporting material layer in an exhaust gas treatment unit length area extending into the closing element interior space.

9. The process in accordance with claim 1, wherein the tubular circumferential wall connection area of the second closing element is connected to the circumferential wall by a welding connection in substance.

10. The process in accordance with claim 1, wherein at least one closing element comprises a funnel-like tapering area between a tubular circumferential wall connection area and a tubular exhaust gas pipe connection area.

11. The process in accordance with claim 1, wherein the first closing element is provided as an inlet closing element positioned upstream in relation to the circumferential wall in relation to an exhaust gas flow direction.

12. The process in accordance with claim 1, wherein a closing element interior space formed in the first closing element does not have an inner funnel element therein, or/and an inner funnel element is arranged in a closing element interior space formed in the second closing element.

13. The process in accordance with claim 1, wherein after the step of arranging a first of the two closing elements at one of the axial end areas of the circumferential wall, the first closing element is enclosed with an insulating material layer and with a thin-wall insulation covering the insulating material layer on an outer side thereof.

14. The process in accordance with claim 1, wherein the supporting material layer comprises a fiber material mat wound around the outer circumference of the exhaust gas treatment unit.

15. The process in accordance with claim 1, wherein the exhaust gas treatment unit comprises a particle filter.

\* \* \* \* \*